United States Patent
Oklejas, Jr. et al.

(10) Patent No.: US 6,309,174 B1
(45) Date of Patent: Oct. 30, 2001

(54) THRUST BEARING FOR MULTISTAGE CENTRIFUGAL PUMPS

(75) Inventors: Eli Oklejas, Jr., Monroe, MI (US); Andrew T. Rensink, Maplegrove, MN (US)

(73) Assignee: Fluid Equipment Development Company, LLC, Monroe, MI (US)

( * ) Notice: Subject to any disclaimer, the term of this patent is extended or adjusted under 35 U.S.C. 154(b) by 0 days.

(21) Appl. No.: 09/031,446

(22) Filed: Feb. 26, 1998

Related U.S. Application Data

(60) Provisional application No. 60/039,558, filed on Feb. 28, 1997.

(51) Int. Cl.[7] ................................................ F01D 3/00
(52) U.S. Cl. .......................... 415/104; 415/131; 415/229; 415/58.4
(58) Field of Search .................................... 415/104, 106, 415/107, 112, 131, 132, 229, 58.4, 59.1; 417/365

(56) References Cited

U.S. PATENT DOCUMENTS

| | | |
|---|---|---|
| 2,748,714 * 6/1956 | Henry | 415/104 |
| 3,160,108 * 12/1964 | Sence | 415/106 |
| 3,664,758 * 5/1972 | Sato | 415/106 |
| 3,828,610 * 8/1974 | Swearingen | 73/140 |
| 4,187,173 2/1980 | Keefer . | |
| 4,230,564 10/1980 | Keefer . | |
| 4,432,876 2/1984 | Keefer . | |
| 4,973,408 11/1990 | Keefer . | |
| 5,819,524 10/1998 | Bosley et al. . | |
| 5,951,169 9/1999 | Okleias et al. . | |
| 5,980,114 11/1999 | Okleias, Jr. . | |
| 6,036,435 3/2000 | Okleias . | |

* cited by examiner

Primary Examiner—Edward K. Look
Assistant Examiner—Ninh Nguyen

(57) ABSTRACT

A pump has a thrust bearing has a casing with an inlet port and a discharge port. A shaft is positioned within the pump. A thrust bearing is coupled to the shaft. A pressure alterable bearing cavity is located within the casing. The pressure alterable cavity allows the axial thrust on the shaft from the impellers to be counteracted. The thrust bearing has an annular seal coupled with respect to the casing disc is coupled to the shaft and positioned adjacent the seal. The seal and the disc have a gap therebetween. A feedback pipe couples the bearing cavity to the inlet port. As the axial thrust acting on the shaft changes, the gap between the seal and the disc also changes. The changing of the gap changes the pressure within the bearing cavity. The disc and thus the shaft are repositioned in response to the change in the bearing cavity pressure change.

40 Claims, 4 Drawing Sheets

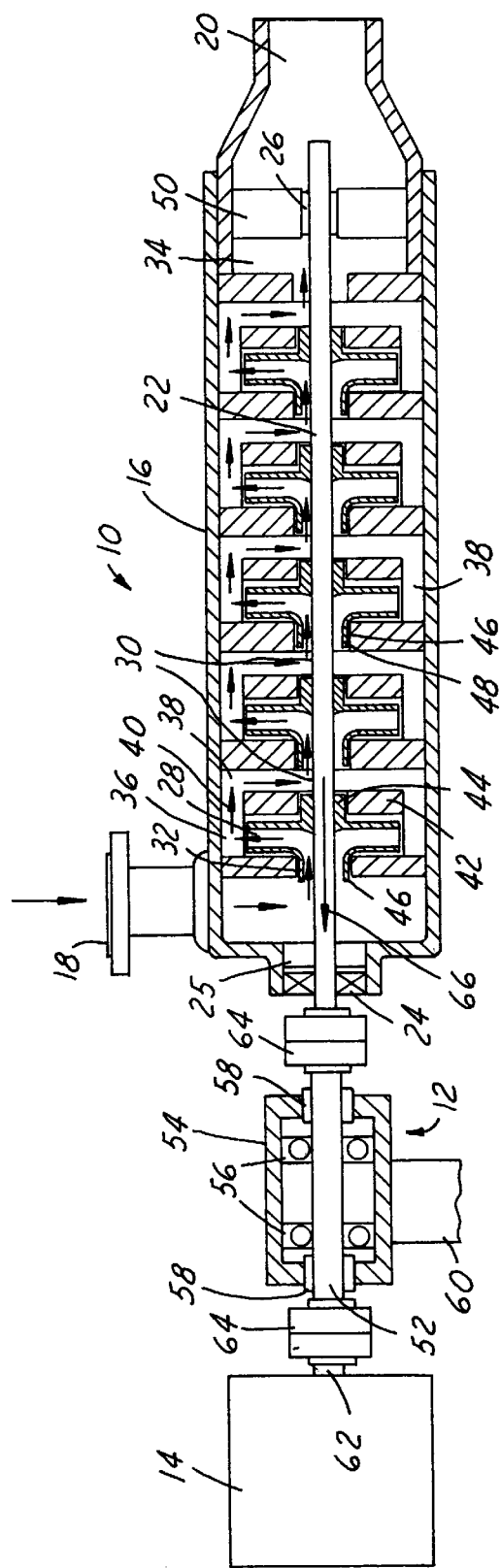
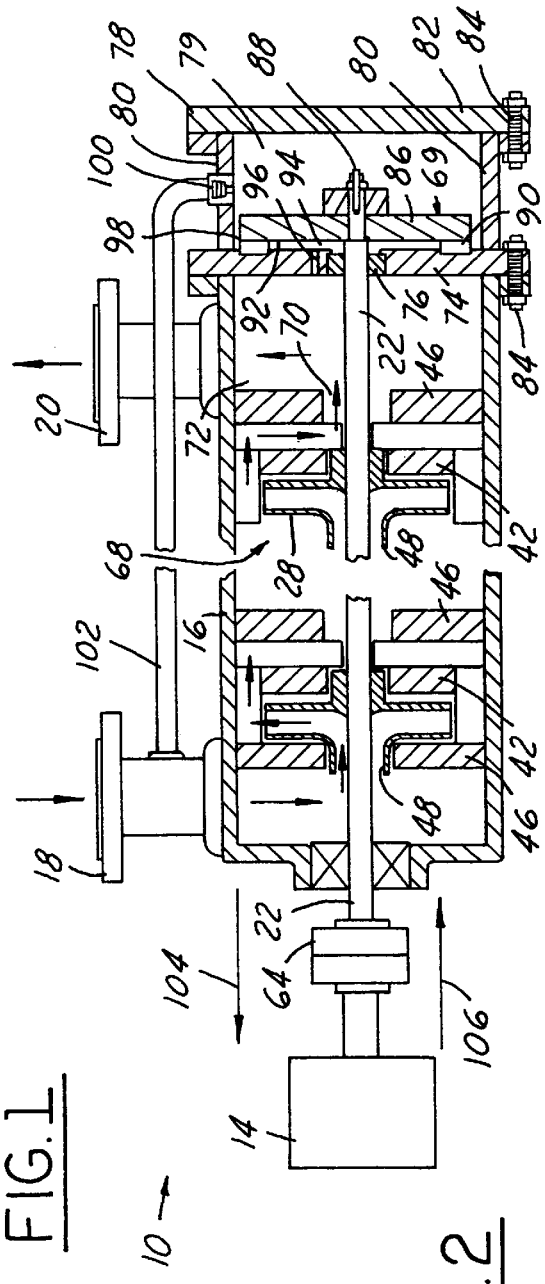
FIG.1 (PRIOR ART)
FIG.2

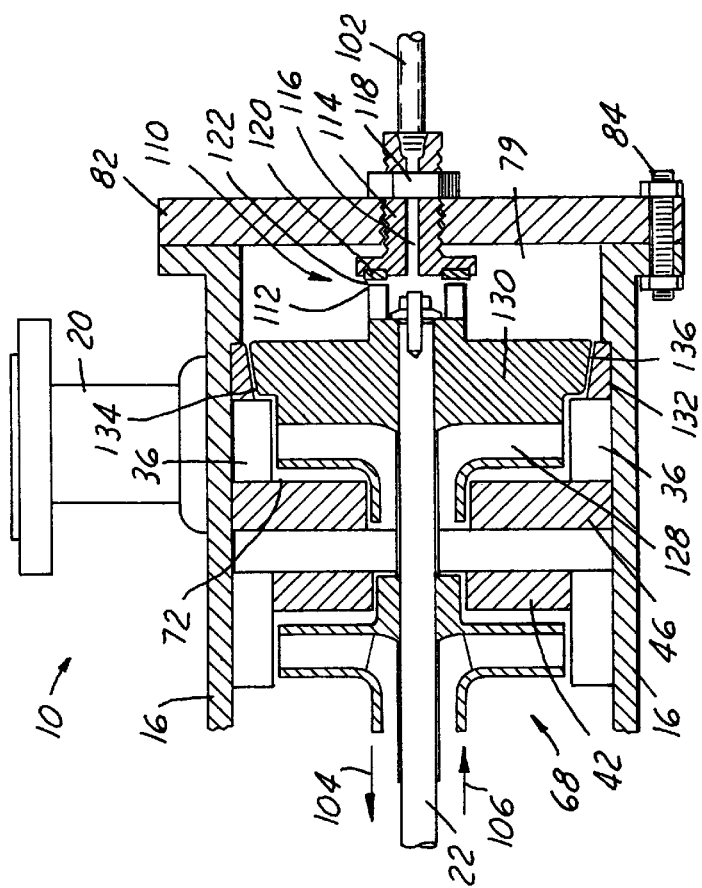
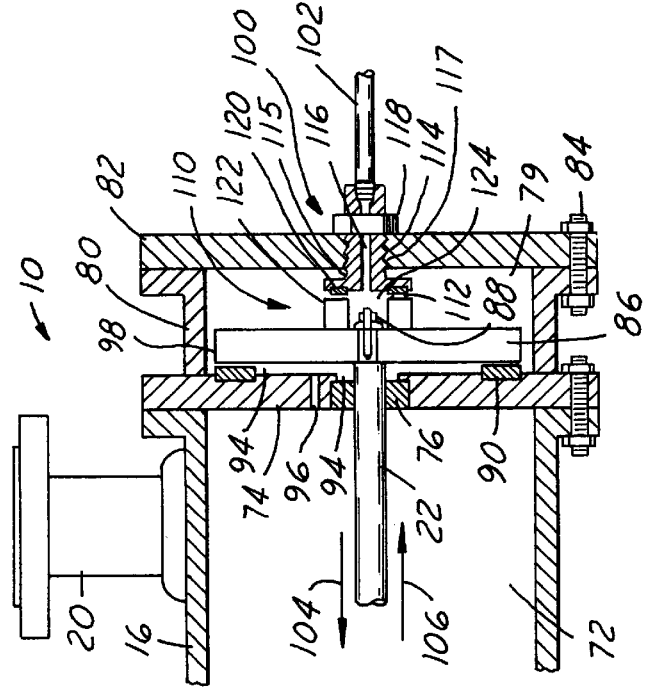
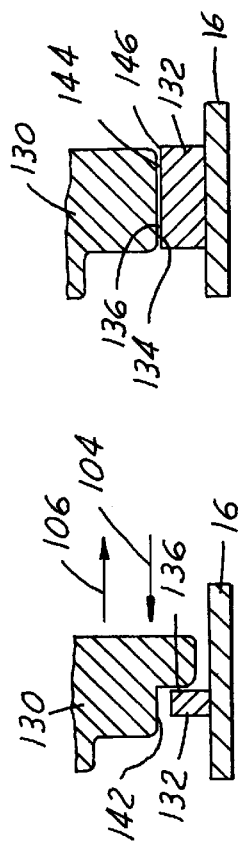
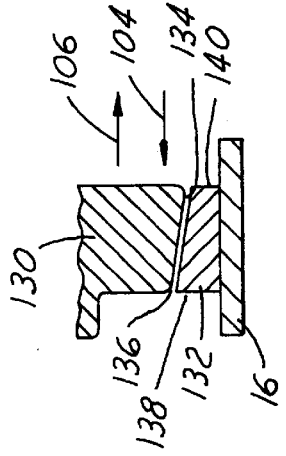

THRUST BEARING FOR MULTISTAGE CENTRIFUGAL PUMPS

RELATED APPLICATION

This application claims priority to provisional application 60/039,558 filed on Feb. 28, 1997, which is incorporated by reference herein.

BACKGROUND OF THE INVENTION

The present invention relates generally to thrust bearings for pumps and turbines. More specifically, the present invention relates to an improved thrust bearing for accommodating axial thrust acting on the rotors of pumps.

Pumps are rotating machines that increase the pressure of fluids traveling through the pump casing. An impeller or series of impellers are mounted on a shaft within the pump casing. The rotating impellers increase the pressure on the fluid as the fluid travels through the casing. A motor also having a shaft is coupled to the pump shaft to provide the rotating movement.

Barrel pumps are a type of centrifugal pump that use many impeller stages mounted on a common shaft. The impellers face the same direction and are separated by a diffuser, cross over channel and return channel. The shaft with the impellers is mounted into a casing. Low pressure fluid enters the casing at one end of the impeller array and passes through each impeller. The fluid pressure is successively increased by each impeller. At the opposite end of the impeller array the fluid exits the casing from the discharge outlet at a high pressure.

Various forces act on the impeller shaft during operation of the pump. For long shafts with a number of impellers, the shaft must be supported at intermediate points along its length to prevent excessive sagging or curvature. Commonly, bushings that closely fit around the shaft are mounted between the impellers. The bushings act as bearings to counteract the radial forces and to maintain the desired radial position of the shaft.

Axial thrust also acts on the impeller during operation. The axial thrust is additive for each impeller. Since the impellers are attached to the shaft, very strong axial forces may develop along the shaft.

Another force acting on the shaft is an axial force generated by the difference between the low pressure at the inlet of the pump and the high pressure at the outlet of the pump. This axial force, depending on the pump configuration, is typically in the same direction as the axial thrust generated by each impeller. The axial thrust tends to bend the shaft if the thrust bearing is at the inlet end of the shaft.

In pump design, it is desirable to provide a shaft having the smallest diameter possible. By providing a small diameter shaft the amount of flow permitted in the impeller inlet region, which is sometimes called the eye, is maximized. By reducing the shaft diameter, however, the tendency for the shaft to bend is increased.

One way in which axial thrust is accommodated is to allow the bearings of the motor driving the pump to absorb any axial thrust. Because of the high thrust developed by some pumps, special motors may be required to accommodate the axial thrust. By providing a special motor, the typical life of the motor is increased. The cost of the motor is also increased.

Another way in which axial thrust is accommodated in pumps is that a bearing assembly is located between the shaft of the pump and the shaft of the driving motor. Typically, the bearings are rolling contact type such as ball or roller bearings that are lubricated by oil or grease. The bearing housing is independently supported to transmit the thrust force from the pump shaft to the base plate or other structure supporting the bearing housing. One problem associated with a separate bearing assembly is that the components are extremely difficult to manufacture, they require a separate lubrication system and they also require shaft seals. All of these drawbacks undesirably increase the cost of the pump system.

FIG. 1 illustrates a typical barrel pump 10 coupled to a bearing assembly 12. Bearing assembly 12 is coupled to a motor 14. Bearing assembly 12 is used to absorb axial thrust from pump 10 and prevent the axial thrust from reaching motor 14.

Pump 10 has a casing 16. Casing 16 has an inlet port 18 and a discharge port 20. A pump shaft 22 runs longitudinally within casing 16. Radial shaft bearings 25 and 26 support shaft 22 in a rotatable fashion within casing 16. Shaft 22 supports a plurality of impellers 28. Impellers 28, spaced axially apart by shaft sleeves 30, are affixed to shaft 22. Each impeller 28 increases the pressure from the previous stage. Seal 24 seals the end of casing 16 from leaking around shaft 22.

Each impeller stage has an inlet 32 which transmits water toward impeller outlet 34. Impeller inlet 32 is located adjacent to shaft 22. Impeller 28 changes the direction of flow from inlet 32 in an axial direction to a radial direction when fluid is discharged from impeller outlet 34. A diffuser 36 redirects fluid from impeller outlet 34 into a crossover channel 38. Crossover channel 38 transmits fluid into a return channel 40. Return channel 40 redirects water in a radial direction toward shaft 22. Return channel 40 ends at the input to the next impeller stage or at the discharge port 20 in the final stage. An interstage piece 42 separates the various impeller stages.

Each impeller 28 has an impeller hub 44 and impeller ring 48. To reduce leakage between impeller stages, a close clearance is established between each impeller ring 48 and wear ring 46. A close clearance is also established by interstage piece 42 and impeller hub 44 to prevent leakage.

A strut 50 is used to support shaft bearing 26. Strut 50 extends across casing 12 and allows fluid to reach discharge port 20. Strut 50 only minimally effects the flow of fluid exiting pump 10.

Bearing assembly 12 has a shaft 52 and a bearing housing 54. Within bearing housing 54 are a plurality of bearings 56 supporting bearing shaft 52. Seals 58 enclose shaft 52 within housing 54 to prevent leakage of fluid from within bearing housing 54. A bearing housing strut 60 supports bearing housing 54. Bearing housing strut 60 is preferably not coupled to a support for pump 10 or motor 14 so that any forces may be transmitted through bearing housing to strut 60.

Motor 14 has a motor shaft 62. Bearing shaft 52 is coupled to motor shaft 62 and pump shaft 22 by couplings 64.

As is common in prior known barrel pumps, a force is developed in an axial direction as shown by arrow 66. Bearing assembly 12 absorbs axial thrust to prevent the axial thrust from being transmitted to motor 14.

SUMMARY OF THE INVENTION

It is therefore one object of the invention to provide a barrel pump and driver assembly that does not require special couplings, separate bearing housing or motor bearings. By eliminating expensive couplings and bearings the overall cost of manufacture and operation of the pump is significantly reduced.

In one embodiment of the invention, a pump has a casing with an inlet port and a discharge port. A shaft is positioned within the pump. A thrust bearing is coupled to the shaft. A pressure alterable bearing cavity is located within the casing. The pressure alterable cavity allows the axial thrust on the shaft from the impellers to be counteracted. The thrust bearing has an annular seal coupled with respect to the casing. A disc is coupled to the shaft and positioned adjacent the seal. The seal and the disc have a gap therebetween. A feedback pipe couples the bearing cavity to the inlet port. As the axial thrust acting on the shaft changes, the gap between the seal and the disc also changes. The changing of the gap changes the pressure within the bearing cavity. The disc and thus the shaft are repositioned in response to the change in the bearing cavity pressure change.

One advantage of the invention is that axial thrust acting on the driving motor is reduced.

Another advantage of the invention is that expensive lubricated bearings are not required in the operation of the pump.

Yet another advantage of the invention is that a thrust bearing has been integrated into the pump housing and is lubricated and cooled by the pumpage. The thrust bearing ensures that the shaft is under tension from axial thrust which help stabilize the position of the shaft.

BRIEF DESCRIPTION OF THE DRAWINGS

Other features and advantages of the present invention will become apparent from the detailed description which should be read in conjunction with the drawings in which:

FIG. 1 is a cut away elevational view of a pump as is known in the prior art;

FIG. 2 is a partial cross sectional view of a pump according to the present invention;

FIG. 3 is a partial cross sectional view of a pump housing having an alternative thrust bearing according to the present invention;

FIG. 4 is a partial cross sectional view of a pump housing having yet another alternative thrust bearing according to the present invention;

FIG. 5 is a cross sectional view of the sealing arrangement between a shroud and sealing ring of FIG. 4;

FIG. 6 is a partial cross sectional view of an alternative sealing arrangement to that of FIG. 5;

FIG. 7 is a cross sectional view of yet another alternative sealing arrangement suitable for incorporation into that of FIG. 4;

DETAILED DESCRIPTION OF THE PREFERRED EMBODIMENT

Figures 8, 9:
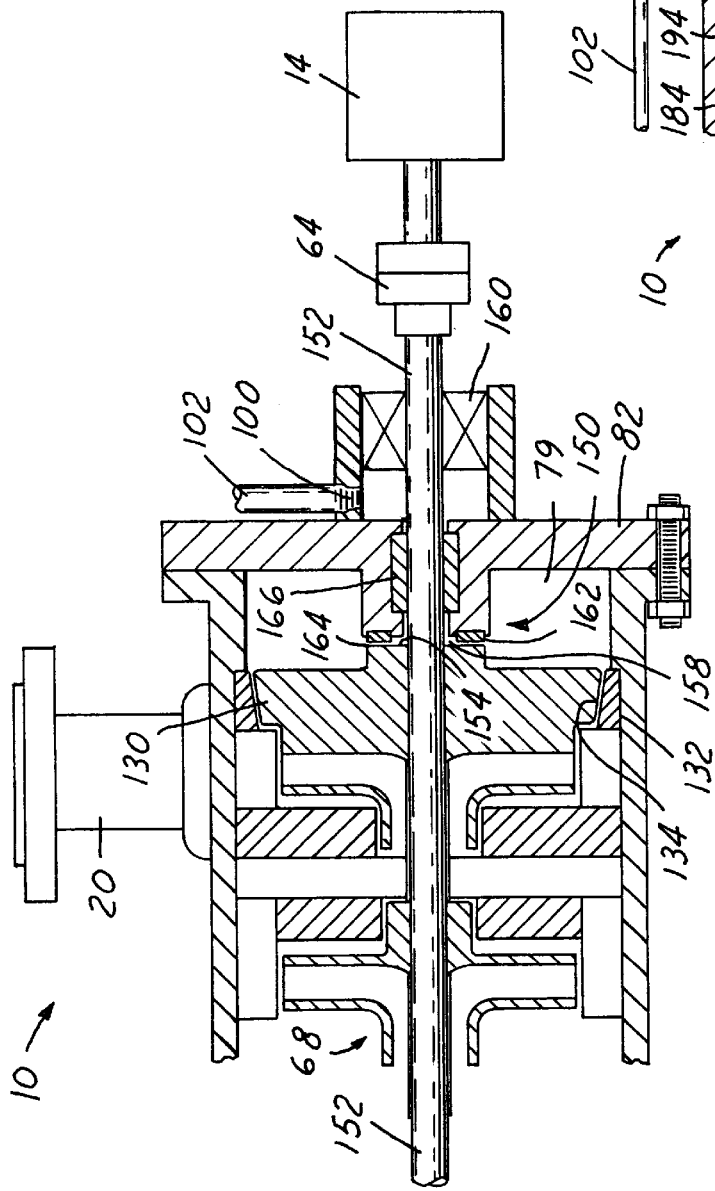
FIG. 8 is a partial cross sectional view of an alternative embodiment of a thrust bearing.
FIG. 9 is still another alternative thrust bearing for a pump.

Referring now to the drawings, like reference numerals are used to identify identical components in the various views. While the pump is illustrated with a particular number of stages, the teachings of the present invention may apply equally to pumps having different numbers of impeller stages.

Referring now to FIG. 2, a portion of a pump and portions of first stage and a final stage 68 are illustrated. Pump 10 is coupled to motor 14 through coupling 64. Coupling 64 allows small axial movement of shaft 22.

A thrust bearing 69 is included as a part of the pump to help balance axial loading on shaft 22. The return channel 42 extends radially to near shaft 22. A passage 70 is defined between return channel 42 and shaft 22. Passage 70 allows highly pressurized fluid from final stage 68 to pass into discharge chamber 72. Discharge chamber 72 is coupled to discharge port 20. Discharge chamber 72 is also defined by a sidewall 74. Sidewall 74 may be integral with casing 16 or a separate piece. Sidewall 74 may be used to support shaft 22. Preferably, a sleeve bearing 76 is positioned between shaft 22 and sidewall 74. Sleeve bearing 76 reduces the friction between shaft 22 and sidewall 74.

Shaft 22 extends into a bearing cavity 79 enclosed by a thrust bearing housing 78. Thrust bearing housing 78 may be an extension of casing 16 or formed of separate pieces. As illustrated, a cylindrical wall 80 extends in a generally longitudinal direction from casing 16. An end wall 82 is coupled to wall 80 and defines the thrust bearing housing 78 along with sidewall 74. Retaining bolts 84 may be used to couple end wall 82 to walls 80 and sidewall 74 to casing 16. Of course, other fastening means would be evident to those skilled in the art. Bearing cavity 79 is thus defined by wall 80, end wall 82, and sidewall 74 within bearing housing 78.

Shaft 22 has a balance disc 86 coupled thereto by a retaining bolt 88 or other suitable coupling means. Balance disc 86 preferably has a solid cross section and, in this embodiment, has a diameter greater than the diameter of impeller ring.

Sidewall 74 has a sealing land 90 coupled thereto. Sealing land 90 is positioned adjacent to a face 92 of balance disc 86 and is preferably annular in shape. Sealing land 92 is positioned within the outer diameter of balance disc 86. Sealing land 90 is preferably formed of a material such as graphite that will not gall when contact is made with the material of balance disc 86. If a rapid change in thrust is experienced by shaft 22, such as during a break in the discharge port 20, sealing land 90 helps accommodate any incidental contact.

The face 92 of balance disc 86, sealing land 90 and sidewall 74 define a pressure cavity 94 within bearing cavity 79. Throttle ports 96 couple discharge chamber 72 to pressure cavity 94. A variable clearance gap 98 is formed between sealing land 90 and face 92 of balance disc 86 to allow pressure to build up and to be relieved from within pressure cavity 94 during operation.

A drain port 100 is coupled to bearing cavity 79. A pipe 102 couples bearing cavity 79 to inlet port 18. By coupling bearing cavity 79 to inlet port 18, the pressure in bearing cavity 79 will not be substantially greater than the pressure at inlet port 18.

In operation of the embodiment of FIG. 2, fluid is input to casing 16 by inlet port 18. The fluid travels through impellers 28 where each impeller increases the pressure of the fluid as the fluid moves toward discharge chamber 72 and discharge port 20. Most of the fluid entering discharge chamber exits through discharge port 20.

Some fluid travels from discharge chamber 72 into pressure cavity 94. The amount of fluid depends on the cumulative area of throttle ports 96 and the clearance of variable clearance gap 98 and relative pressures of the discharge chamber 72, pressure cavity 94 and bearing cavity 79.

As the shaft 22 rotates, an axial thrust shown by arrow 104 acts toward coupling 64. Consequently, balance disc 86 is moved in the direction indicated by arrow 104. Clearance gap 98 is thus reduced between face 92 and sealing land 90. As a result the flow rate through throttle ports 96 is reduced. As the pressure in pressure cavity 94 increases, an equilibrium clearance in clearance gap 98 is reached when the pressure force acting on face 92 of balance disc 86 matches the axial force exerted on shaft 22 by the rotating impellers.

When the axial force on balance disc 86 exceeds the axial force on shaft 22, movement in direction toward discharge chamber 72 indicated by arrow 106 is developed. Such movement causes clearance gap 98 to increase to allow more fluid to enter into bearing cavity 79. As a result, the flow rate through throttle port 96 increase resulting in a pressure drop in pressure cavity 94. The loss of pressure in pressure cavity 94 will cause a change in the pressure force on balance disc which will cause movement in the opposite direction.

The size of throttle ports 96 is an important design factor. By enlarging throttle ports 96, a greater clearance in clearance gap 98 is required to obtain axial balancing. However, larger sized throttle ports increase the flow through pipe 102 from bearing cavity 79. This increased flow reduces the net capacity to pump and the efficiency of the pump. By using smaller sized throttle ports 96, a lower flow rate is obtained between face 92 and sealing land 90. Throttle ports 96 are sized to achieve a compromise between efficiency and practical manufacturing tolerances in a production environment.

By reducing clearance gap 98, very high manufacturing tolerances are required so that rubbing contact is not obtained between sealing land 90 and face 92. High precision manufacturing is cost prohibitive for many commercial embodiments. Thus, a desirable commercial embodiment strikes a balance between manufacturing costs and low tolerances.

Referring now to FIG. 3, an embodiment similar to that of FIG. 2 is shown. Only the portion of casing 16 defining a portion of discharge chamber 72 and bearing cavity 79 is shown.

Balance disc 86 preferably has a diameter greater than the diameter of the impeller ring. In FIG. 3, an additional bearing, a secondary bearing 110, is shown from that in FIG. 2. Balance disc 86 may be slightly modified from that shown in FIG. 2 to accommodate bearing 110. Balance disc 86 has an annular surface 112 extending in an axial direction toward end wall 82. Annular surface 112 is preferably concentric with shaft 22. Annular surface 112 may be integrally formed with disc 86 or a later-attached piece coupled by retaining bolt 88 to disc 86. Annular surface 112 preferably extends beyond the head of retaining bolt 88.

A drain port 100 is located in end wall 82. Preferably, drain port 100 is located concentrically with shaft 22 and annular surface 112. A bearing carrier 114 has a central passage 116 that is fluidically coupled to drain port 100. Bearing carrier 114 preferably has threads 115 that couple with threads 117 in end wall 82. Bearing carrier 114 is secured into position by a locking nut 118. By threading bearing carrier 114, the axial position desired may be adjusted. Locking nut 118 is used to secure bearing carrier 114 once a desired position is reached. Central passage 116 extends through bearing carrier 114 and fluidically couples to pipe 102. Pipe 102 is coupled to inlet port 18 (coupling not shown).

Bearing carrier 114 has a sealing land 120 coupled adjacent to annular surface 112 of balance disc 86. In operation, a secondary clearance gap 122 separates annular surface 112 and sealing land 120. A secondary pressure chamber 124 is defined by balance disc 86, sealing land 120 and annular surface 112. The pressure within secondary pressure chamber 124 is essentially the inlet pressure.

The advantage of adding a secondary bearing 110 to the configuration of FIG. 2 is that the axial movement of the shaft is contained between the sealing land 90 and the secondary sealing land 120.

In operation, the thrust associated with the impeller operation tends to move the shaft in direction indicated by arrow 104. Clearance gap 98 between sealing land 90 and face 92 decreases. Simultaneously, however, secondary clearance gap 122 between annular surface 112 and secondary sealing land 120 increases. The flow rate through clearance gap 98 decreases causing pressure in pressure cavity 94 to increase. Simultaneously, the pressure in bearing cavity 79 decreases because an increased secondary clearance gap 122 between secondary sealing land 120 and annular surface 112 is present. Pressure is relieved through drain port 110 and pipe 102. The pressure changes continue to increase as shaft moves in direction 104 until an equilibrium is reached.

If the shaft moves in a direction of axial thrust shown by arrow 106, clearance gap 98 increases while secondary clearance gap 122 decreases. The pressure in pressure cavity 94 decreases and the pressure in bearing cavity 79 increases. In this embodiment the pressure in bearing cavity 79 may be different from the pressure in pipe 102. Thus, the pressure of pressure cavity of 94 and the pressure of bearing cavity 79 act to balance the axial movement of shaft 22.

Referring now to FIG. 4, the final two stages of a high pressure pump are illustrated. The secondary bearing 110 has a similar configuration to that of that shown in FIG. 3.

Final stage impeller 128 has a thick back shroud 130 coupled thereto. In the preferred embodiment, the final stage impeller 128 and thick back shroud 130 are integrally formed. However, they may be separate pieces. Thick back shroud 130 is essentially a balance disc such as that shown in FIGS. 2 and 3. Shroud 130 preferably has a greater diameter than that of final stage impeller 128.

Shroud 130 has a secondary bearing 110 coupled thereto. Secondary bearing 110 is similar to that shown in FIGS. 2 and 3. Annular surface 112 is coupled to thick back shroud 130. Secondary bearing carrier 114 is adjustable in the axial position in a similar manner to that of FIG. 3.

A sealing ring 132 is located adjacent to an edge 134 on shroud 130. A primary gap 136 is located between shroud 130 and edge 134. As shown in FIGS. 4 and 5, sealing ring 132 is conical in shape. However, other shapes may be used. Sealing ring 132 is securely attached to casing 16. One surface of sealing ring 132 is parallel to the surface of shroud 130. As will be described further below, edge 134 may be conical, rectangular or step shaped.

Bearing cavity 79 is defined by sealing ring 132, shroud 130, end wall 80, wall 80 and secondary bearing 110. Primary gap 136 is increased and decreased in a similar manner to that of clearance gap 98.

As shown in FIG. 5, sealing ring 132 has a thick portion 138 extending further from casing 16 than thin portion 140. Thin portion 140 is preferably toward bearing cavity 79. As shaft moves in the direction indicated by arrow 106, primary gap 136 increases. Thus, a greater flow of fluid enters bearing cavity 79. The advantage of providing a conical sealing ring 132 is that a variable primary gap 136 may be obtained.

Primary gap 136 is reduced if shaft moves in a direction indicated by arrow 104. Thus, the flow of fluid into bearing cavity 79 is decreased.

Referring now to FIG. 6, sealing ring 132 is rectangular in shape. Shroud 130 has a cross section having a step 142. When shaft 22 moves shroud 130 in a direction indicated by arrow 106, primary gap 136 is increased. When shaft moves, shroud 130 in a direction indicated by arrow 104, the primary gap 136 is reduced. The advantage to that of FIG. 6 is that a large change in primary gap 136 is formed by a small change in axial movement of shroud 130.

Referring now to FIG. 7, a rectangular cross section sealing ring 132 is shown. Edge 144 of shroud is parallel to an edge 146 of sealing ring 132. In this embodiment, the primary gap 136 does not vary depending on the axial position of shroud 130. As a result, change of pressure within bearing cavity 79 may not be as responsive as using sealing rings of FIGS. 5 and 6.

In operation of FIGS. 4, 5 and 6, the rotation of impellers creates a force in direction shown by arrow 104. The pressure within bearing cavity 79 decreases while the secondary clearance gap 122 increases. The central passage 116 through pipe 102 allows the pressure within bearing cavity 79 to decrease. When pressure within bearing cavity 79 decreases, shaft 22 tends to move in direction indicated by arrow 106. As the shaft moves shroud 130 in the direction indicated by arrow 106, the pressure within bearing cavity 79 increases due to an increased flow through primary gap 136 and a reduced flow through secondary gap 122. In a similar manner to that of the previous embodiments, the shaft 22 will seek an equilibrium position based on the pressure in bearing cavity 79.

Referring now to FIG. 8, an alternative secondary bearing 150 is illustrated. Secondary bearing 150 is not illustrated as axially positionable as secondary bearing 110 of FIGS. 3 and 4. However, the teachings of the previous embodiments may be used to provide an adjustable secondary bearing 150. In the embodiment of FIG. 8, the pump shaft 152 extends through end wall 82 to couplings 64 and motor 14.

An annular ring 154 is located around shaft 152 and is preferably coupled to shroud 130. Shroud 130 and sealing ring 132 may be configured in a similar manner to that shown in FIGS. 4 through 7. End wall 82 has a bearing carrier 156. Bearing carrier 156 is preferably integrally formed with end wall 82. However, one skilled in the art would recognize that a separate or adjustable bearing carrier 156 may be provided. Bearing carrier 156 has a central passage 158 extending therethrough. Bearing carrier 156 may also have a sleeve bearing 160 that supports shaft 152. Depending on the particular design requirements, sleeve bearing 160 may be eliminated. Sleeve bearing 160 allows fluid to pass through bearing carrier 156 and central passage 158 to reach drain port 100 and pipe 102. Sleeve bearing 160 may be used to radially position shaft 152. Axial balancing is provided in the same manner as described in FIGS. 3 and 4.

Bearing carrier 156 has a sealing land 162 positioned adjacent to annular ring 154. A secondary clearance gap 164 is formed between annular ring 154 and sealing land 162.

Central passage 158 is sealed from shaft 22 by a shaft seal 166. Shaft seal 166 prevents leaks from occurring around the rotating shaft. Central passage 158 is in communication with bearing cavity 79. As secondary clearance gap 164 increases, the flow through central passage 158 also increases. This allows pipe 102 to balance the pressure within bearing cavity 79.

Referring now to FIG. 9, it may be desirable in some pump applications to provide an axial discharge port 170 rather than a radial discharge port as shown as reference number 20 in the previous embodiments. Axial discharge port 170 is defined by a discharge piece 172 that is coupled to housing 16. To prevent leakage, an O ring 174 may be coupled between discharge piece 172 and housing 16.

A balance disc 176 is positioned on a shaft 178. Balance disc 176 preferably has a diameter between the diameter of the impellers and the diameter of the impeller rings. A locking nut 179 is preferably used to couple balance disc 176 to shaft 178. A bearing carrier 181 is positioned adjacent to the final interstage piece 42. Bearing carrier 181 has discharge ports 182 extending between discharge chamber 72 and axial discharge port 170 to allow an axial discharge.

A plurality of O rings 174 may be used to prevent leakage between bearing carrier 181 and casing 16. Bearing carrier 181 supports a bearing seal 184. Bearing carrier 181 also supports a cover 186 which is secured to bearing carrier 181 by a snap ring 187. An O ring 174 may be positioned between the cover 186 and bearing carrier 181 to prevent leakage.

A bearing cavity 79 is defined by balance disc 176, bearing seal 184 and cover 186. An auxiliary bearing piece 188 may be secured within bearing cavity 79 adjacent to shaft 178 to prevent shaft 178 from contacting cover 186.

Bearing cavity 79 is coupled through drain port 100 to pipe 102 in similar manner to that described above. An orifice plate 190 restricts the flow area of drain port 100.

Figure 10:
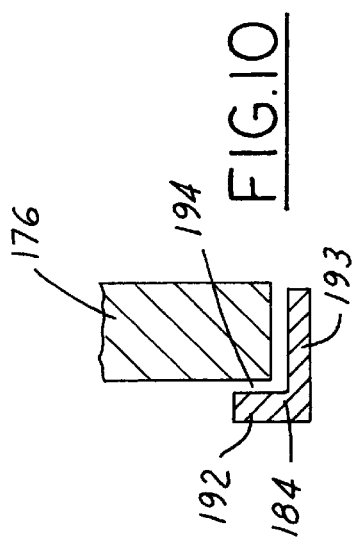
FIG. 10 is a partial cross sectional view of a seal of FIG. 9.

Bearing seal 184 has a radial face 192 and an axial face 193 as is best shown in FIG. 10. A clearance gap 194 is defined between radial face 192 of bearing seal 184 and balance disc 176.

In operation, the rotation of shaft 178 and its impellers creates a thrust in the direction shown by arrow 104. Clearance gap 194 thus is reduced. Pressure within bearing cavity 79 is thus decreased. The decrease in pressure causes shaft 178 and balance disc 176 to move in the direction shown by arrow 106.

When the shaft moves in direction shown by 106, clearance gap 194 increases causing more fluid to enter bearing cavity 79. The pressure across orifice plate 190 increases. The shaft is positioned when equilibrium between the shaft thrust and the pressure within bearing cavity are balanced.

Figure 11:
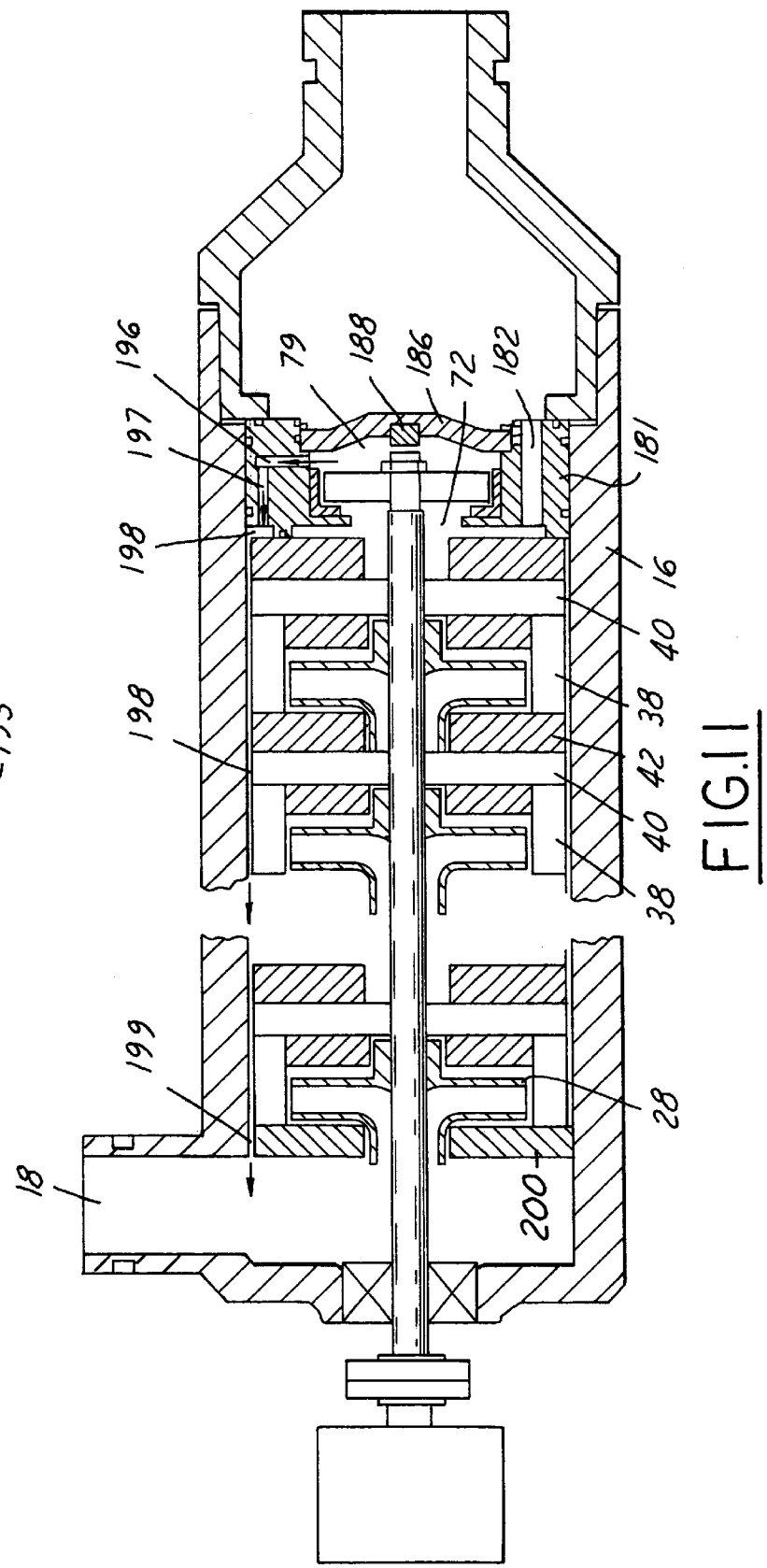
FIG. 11 is a partial cross sectional view of a pump similar to FIG. 9, having an alternative feedback path.

Referring now to FIG. 11, a pump configuration similar to that of FIG. 9 is shown. Bearing carrier 181 has been modified to allow pump feedback within casing 16 rather than through an external pipe such as shown in FIG. 9. Bearing carrier 181 has a pipe 196 and a throttle passage 197 formed therethrough. Pipe 196 and throttle passage 197 connect fluid from bearing cavity 79 into a flow passage 198.

Flow passage 198 is formed between each stage of the impeller 28 and casing 16. That is, flow passage 198 is a small clearance left between cross over channel 38, return channel 40, interstage piece 42 and casing 16.

Flow passage 198 is in fluid communication with inlet port 18 through a slot 199 in a support plate 200. Flow passage 198 may also terminate within the first diffuser 201 rather than extending through support plate 200. The pressure at diffuser 201 is sufficiently low to obtain desired results. A passage 203 through diffuser 201 may be used to couple flow passage 198 to the region adjacent the first impeller.

To regulate the flow from bearing cavity 79 to inlet port 18, the diameter of throttle passage 197 may be sized to permit the desired amount of flow between bearing cavity 79 and inlet port 18. Slot 199 may also be sized to allow the desired amount to flow into inlet port 18.

It should be understood by those skilled in the art that variations and modifications to the preferred embodiments described above may be made without departing from the true scope of the invention as defined by the following claims.

What is claimed is:

1. A thrust bearing assembly for a pump having a casing, shaft having a longitudinal axis and a movable axial position, an inlet port and a discharge chamber comprising:
   an annular seal coupled within said casing;
   a disc coupled to said shaft positioned adjacent said seal, said seal and said disc having a gap therebetween,
   said annular seal and said disc at least partially defining a bearing cavity, said bearing cavity fluidically coupled to said discharge chamber through said gap; and
   a feedback path coupling said bearing cavity to said inlet port,
   wherein a pressure within said bearing cavity controls said axial position of said disc and shaft.

2. A thrust bearing assembly as recited in claim 1, further comprising a secondary seal having a secondary bearing carrier coupled to a secondary sealing land and an annular surface coupled to said disc, said secondary sealing land and said annular surface having a secondary clearance gap therebetween, said secondary bearing fluidically positioned between said bearing cavity and said feedback path.

3. A thrust bearing assembly as recited in claim 1, wherein said second bearing carrier has threads; said bearing cavity further defined by an end wall; said end wall having threads for receiving threads of said bearing carrier.

4. A thrust bearing assembly as recited in claim 1, wherein said annular seal comprises a sealing ring coupled to said casing.

5. A thrust bearing assembly as recited in claim 4, wherein said sealing ring has a rectangular cross section.

6. A thrust bearing assembly as recited in claim 5, wherein said disc is a shroud having an edge, wherein said edge has a rectangular cross section.

7. A thrust bearing assembly as recited in claim 4, wherein said disc is a shroud having an edge, wherein said edge has a step shaped cross section.

8. A thrust bearing assembly as recited in claim 1, wherein said sealing ring has a conical cross section.

9. A thrust bearing assembly as recited in claim 8, wherein said disc is a shroud having an edge, wherein said edge has a conical cross section.

10. A thrust bearing assembly as recited in claim 1, further comprising a substantially cylindrical wall, and an end wall and a side wall partially defining said bearing cavity.

11. A thrust bearing assembly as recited in claim 10, wherein said side wall has throttle ports therethrough fluidically coupling said discharge chamber to said bearing cavity.

12. A thrust bearing assembly as recited in claim 1, wherein further comprising a bearing carrier positioned within said casing and a cover positioned within said casing and coupled to said bearing carrier, said bearing carrier positioning said seal with respect to said disc.

13. A thrust bearing assembly as recited in claim 12, wherein said bearing carrier having an axial discharge port therethrough.

14. A thrust bearing assembly as recited in claim 1, wherein said feedback path is a pipe.

15. A thrust bearing assembly as recited in claim 1, wherein said feedback path is a flow passage within said casing.

16. A pump assembly comprising:
   a casing;
   an axially movable shaft having a longitudinal axis, said shaft having a movable axial position;
   an impeller mounted to said shaft;
   an inlet port mounted to said casing;
   a discharge port mounted to said casing;
   a discharge chamber within said casing and fluidically coupled to said discharge port;
   a bearing cavity fluidically coupled to said discharge chamber;
   an annular seal coupled within said casing;
   a disc coupled to said shaft positioned adjacent said seal, said seal and said disc having a gap therebetween, said annular seal and said disc at least partially defining said bearing cavity, said bearing cavity being fluidically coupled to said bearing cavity through said gap; and
   a feedback path coupling said bearing cavity to said inlet port,
   wherein a pressure within said bearing cavity controls said axial position of said disc and shaft.

17. A pump assembly as recited in claim 16, wherein said impeller having a first diameter, further comprising a wear ring having a second diameter, said disc having a third diameter substantially between said first diameter and said second diameter.

18. A pump assembly as recited in claim 16, farther comprising a secondary seal having a secondary bearing carrier coupled to a secondary sealing land and an annular surface coupled to said disc, said secondary sealing land and said annular surface having a secondary clearance gap therebetween, said secondary bearing fluidically positioned between said bearing cavity and said feedback path.

19. A pump assembly as recited in claim 16, wherein said second bearing carrier has threads; said bearing cavity further defined by an end wall; said end wall having threads for receiving threads of said bearing carrier.

20. A pump assembly as recited in claim 16, wherein said annular seal comprises a sealing ring coupled to said casing.

21. A pump assembly as recited in claim 20, wherein said sealing ring has a rectangular cross section.

22. A pump assembly as recited in claim 21, wherein said disc is a shroud having an edge, wherein said edge has a rectangular cross section.

23. A pump assembly as recited in claim 20, wherein said disc is a shroud having an edge, wherein said edge has a step shaped cross section.

24. A pump assembly as recited in claim 20, wherein said sealing ring has a conical cross section.

25. A pump assembly as recited in claim 24, wherein said disc is a shroud having an edge, wherein said edge has a conical cross section.

26. A pump assembly as recited in claim 16, further comprising a substantially cylindrical wall, and an end wall and a side wall partially defining said bearing cavity.

27. A pump assembly as recited in claim 26, wherein said side wall has throttle ports therethrough fluidically coupling said discharge chamber to said bearing cavity.

28. A pump assembly as recited in claim 16, wherein further comprising a bearing carrier positioned within said casing and a cover positioned within said casing and coupled to said bearing carrier, said bearing carrier positioning said seal with respect to said disc.

29. A pump assembly as recited in claim 28, wherein said bearing carrier having an axial discharge port therethrough.

30. A pump assembly as recited in claim 16, wherein said feedback path is a pipe.

31. A pump assembly as recited in claim 16, wherein said feedback path is a flow passage within said casing.

32. A pump assembly comprising:

a casing;

an axial discharge piece coupled to said casing;

an axially movable shaft having a longitudinal axis, said shaft having a movable axial position, said shaft rotatably coupled within said casing;

an impeller mounted to said shaft;

an inlet port through said casing;

a discharge chamber;

a bearing carrier coupled within said casing, said bearing carrier having a discharge port fluidically coupling said discharge chamber to said discharge piece;

a balance disc coupled to said shaft;

a cover coupled to said bearing carrier;

a seal coupled to said bearing carrier;

said balance disc, said seal, said bearing carrier and said cover defining a bearing cavity therebetween;

a feedback path coupling said bearing cavity to said inlet port;

wherein a pressure within said bearing cavity controls said axial position of said disc and shaft.

33. A pump assembly as recited in claim 32, wherein said seal has an axial face and a radial face.

34. A pump assembly as recited in claim 32, wherein said bearing carrier is secured to said cover by a snap ring.

35. A pump assembly as recited in claim 32, wherein said shaft extends through said balance disc.

36. A pump assembly as recited in claim 35, further comprising an auxiliary bearing piece coupled to said cover within said bearing cavity adjacent said shaft.

37. A pump assembly as recited in claim 35, wherein said balance disc has threads.

38. A pump assembly as recited in claim 37, wherein further comprising a nut coupling said disc to said shaft.

39. A pump assembly as recited in claim 32, wherein said feedback path is a pipe.

40. A pump assembly as recited in claim 32, wherein said feedback path is a flow passage within said casing.

* * * * *